March 29, 1960

R. E. GREENOUGH 2,930,553

AIRCRAFT COOLING METHOD

Filed Aug. 22, 1956

INVENTOR.
RAYMOND E. GREENOUGH
BY

ATTORNEY 2,930,553
Patented Mar. 29, 1960

2,930,553
AIRCRAFT COOLING METHOD

Raymond E. Greenough, Berea, Ohio, assignor to Cleveland Pneumatic Industries, Inc., Cleveland, Ohio, a corporation of Ohio Application August 22, 1956, Serial No. 605,558

2 Claims. (Cl. 244—118)

This invention relates generally to aircraft cooling systems and more particularly to a new method and apparatus for cooling high speed aircraft.

Many modern tactical aircraft are capable of flying at extremely high speeds well in excess of Mach I. At such speeds high skin temperatures are encountered which makes it necessary to cool the pilot and certain of the accessory equipment even though the aircraft may be operating in sub-zero environmental temperatures. In extreme speed conditions, even the ram air is not satisfactory for cooling operations since compression of the ram air increases its temperature to the point where it is too hot to be used for cooling.

These high speed tactical aircraft use great quantities of fuel in high speed flight so that it is often necessary to refuel the aircraft prior to the entry thereof into the combat area. Such refueling is done by the use of an airborne tanker aircraft while both aircraft are in flight. These tanker aircraft travel at slow speeds when compared to the potential speeds of the tactical aircraft even though they are relatively fast when compared to present day commercial aircraft. At the normal cruising speeds of the tanker aircraft, both skin and ram air temperatures are relatively low and approach the temperature of the environment.

It is an important object of this invention to provide an aircraft cooling apparatus which incorporates a relatively slow speed tanker aircraft having means to cool the transported fuel prior to its transfer to a tactical aircraft in combination with a tactical aircraft having means to use the cold fuel to cool critical areas thereof.

It is another important object of this invention to provide a method of cooling high speed aircraft wherein a tanker aircraft is flown at high altitudes to cool the transported fuel to a temperature approaching the temperature of the high altitude air and thereafter transferring the transported fuel while cold to a tactical aircraft so that the cold fuel may be used as a sump for the absorption of heat within the tactical aircraft.

It is still another object of this invention to provide an aircraft cooling apparatus wherein fuel for the aircraft is cooled to a low temperature prior to the fueling of the aircraft in combination with means for transferring heat from selected portions of the aircraft to the cold fuel to cool such portions.

Figure 1:
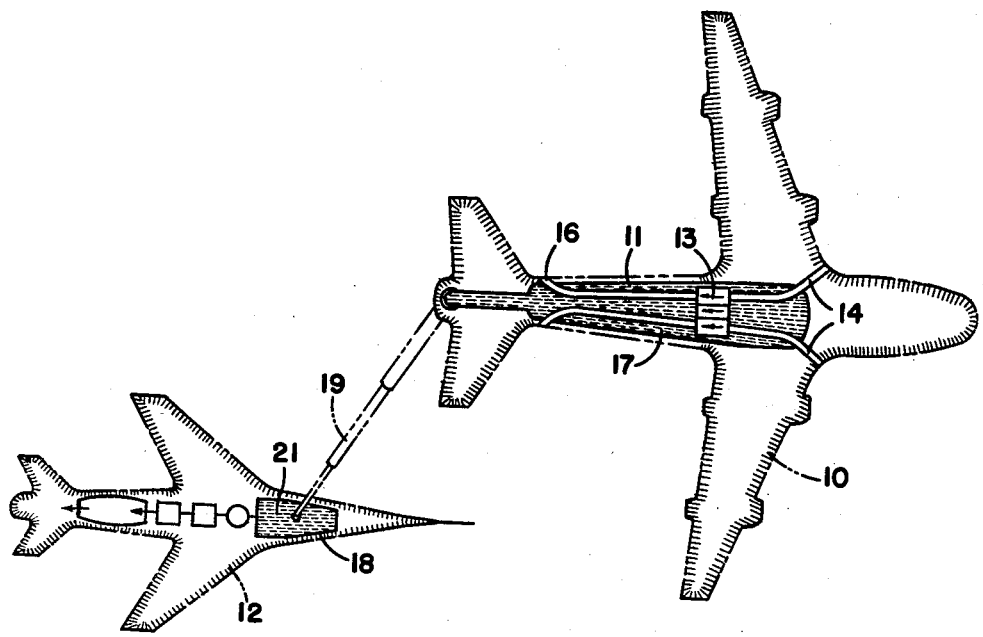
Figure 2:
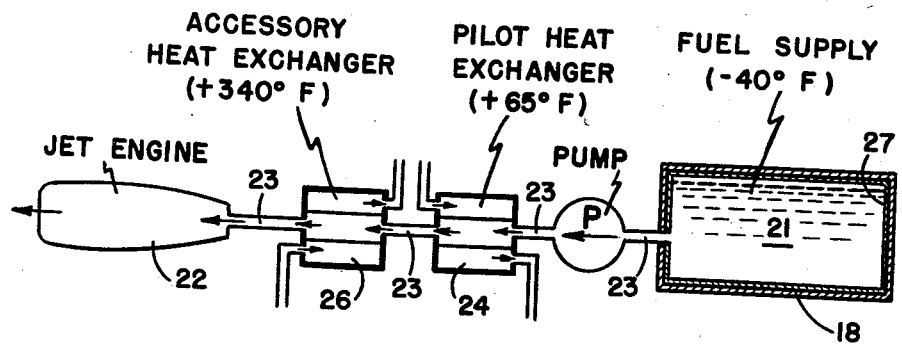

Further objects and advantages will appear from the following description and drawings, wherein:

Figure 1 is a schematic illustration of the entire apparatus necessary to perform the cooling operation according to this invention showing a tanker aircraft supplying fold fuel to a high speed tactical aircraft; and, Figure 2 is a schematic illustration of the basic apparatus within the tactical aircraft necessary to provide aircraft cooling according to this invention.

In a supersonic aircraft tremendous amounts of power must be expended in short periods of time which requires a very rapid consumption of fuel. For this reason, it is normally desirable and very often necessary to refuel the tactical aircraft as it approaches the combat zone so that it will have sufficient fuel to carry out the combat mission. It will readily be understood that once within the combat zone, the tactical aircraft will often fly at near maximum speeds. At these near maximum speeds, cooling becomes extremely difficult since the aircraft are subject to what is popularly known as the thermal barrier. Under these conditions both the skin and ram air temperatures reach extremely high values which cause the aircraft to heat up beyond the temperatures which the pilot and some accessory equipment can tolerate. Because the skin temperature is so high, cooling must be provided for the pilot and various critical equipment such as the landing gear, its rubber tire, and the electrical equipment. Since the ram air temperature is high, conventional methods of cooling by the use of ram air are unsatisfactory at least insofar as cooling the pilot is concerned. Even though modern design has raised the possible operating temperatures of the aircraft accessories, the temperature tolerance of the human pilot cannot be changed. If refrigeration equipment having compressors and multiple heat exchangers is used, a large weight and power penalty will result. In a system incorporating this invention, a large amount of cooling may be achieved without necessitating the use of heavy equipment because the system utilizes to a great extent existing equipment which is necessarily already within the aircraft.

In the drawings, a schematic illustration is shown of the basic elements of an aircraft cooling apparatus according to this invention. Also, illustrative temperatures are given with the understanding that they are for purposes of illustration and provide only examples of what can be considered a normal installation. It should be understood that the basic concept may be embellished and tailored to fit a particular need and that the illustrated embodiment is used merely to disclose the basic concept of the invention and to illustrate one example of the structure for its use.

Figure 1 schematically shows a tanker aircraft 10 which is provided with a large fuel tank 11 in which is stored fuel for a tactical aircraft 12. When the tanker aircraft is flown at high altitudes where in the atmospheric air is at subzero temperatures, cooling air is drawn into a heat exchanger 13 through inlet ducts 14. If sufficient altitude is achieved, the cooling air flowing through the inlet duct 14 may be —40° or colder. This cold air is passed through the heat exchanger 13 and exhausted through exhaust ducts 16 after fuel 17 within the fuel tank 11 has been cooled. The heat exchanger 13 may be immersed in the fuel 17 so that fuel completely surrounds the heat exchanger to insure maximum heat transfer. The arrows indicate the directions of flow in the preferred heat exchanger. Therefore, while the tanker aircraft 10 flies to the rendezvous point with the tactical aircraft 12, the fuel 17 is cooled to temperatures which may be in the order of —40° F. At the rendezvous point, the fuel 17 is transferred to a fuel tank 18 within the tactical aircraft 12 by a flight refueling mechanism 19. Therefore, the tactical aircraft 12 is provided with cold fuel 21 within its fuel tank 18.

Reference may now be made to Figure 2. The fuel 21 within the fuel tank 18 is then supplied to a jet engine 22 which is used to power the tactical aircraft. Because of high power requirements of such aircraft large amounts of fuel are consumed by such jet engines at very rapid rates. A pump "P" is used to pump the fuel 21 from the fuel tank 18 to the jet engine through suitable conduits 23. Any form of pump suitable for this purpose may be used whether it be immersed in the fuel tank 18 or connected thereto by fluid conduits. As the fuel 21 flows from the fuel tank 18 to the jet engine 22, it is passed through one or more heat exchangers 24 and 26, two of which are shown in the illustrated embodiment. Preferably the heat exchanger 24 which is the first to receive the fuel 21 from the fuel tank 18 is used to cool the pilot's compartment of the aircraft. This arrangement is desirable because the pilot's compartment must be maintained at a colder temperature than most critical aircraft equipment.

Assuming the fuel 21 is at a temperature of $-40°$ F. in the fuel tank 18, heat may be added to the fuel within the heat exchanger 24 in sufficient quantities to heat the fuel leaving the heat exchanger 24 to a temperature in the order of $+65°$ F. while still using the simple heat exchanger principle. In this way, the pilot's compartment, which is cooled by the heat exchanger 24, may be maintained at temperatures which can be tolerated by the human pilot. The fuel 21 can then be passed into a second heat exchanger 26 which is used to cool various critical accessories of the aircraft. Since accessories can withstand higher temperature than the pilot, the discharge fluid from the heat exchanger 24 is satisfactory for such cooling. Depending upon the accessory being cooled and the various other design criteria the fuel leaving the heat exchanger 26 may reach temperatures in the order of $+340°$ F. It should be understood that even though only one heat exchanger is shown for accessory cooling, the particular design problems of a given aircraft may require several heat exchangers for this purpose. The fuel 21 leaving the heat exchanger 26 can then be supplied to the jet engine 22 to produce power.

The particular type of heat exchanger used may vary widely in different installations and may be a direct air heat exchanger wherein air is cooled by the fuel 21 or a fluid heat exchanger wherein an intermediate cooling fluid such as oil may be cooled by the fuel 21. If such intermediate fluid is used, this fluid would be circulated to secondary heat exchangers so that it may absorb heat from the load itself. In the preferred embodiment, the fuel tank 18 of the tactical aircraft 12 would be provided with insulation 27 so that the cooling potential of the fuel 21 would not be lost by cooling non-critical portions of the aircraft. Most jet engine fuel is a form of kerosene having a specific heat in the order of 0.5 so if the assumed temperatures are used wherein the fuel is heated from $-40°$ to $+340°$ F. 190 B.t.u.'s of cooling will be provided for each pound of fuel consumed. Since the fuel is consumed at high rates when the tactical aircraft 12 is flying at high speeds in excess of Mach I, large amounts of cooling are available. I prefer to provide the structure wherein the heat exchangers 24 and 26 are cooled by fuel flowing from the fuel tank 18 to the jet engine 22. Since the cooling load increases as the aircraft speed increases and the rate flow of fuel increases at the same time, therefore more cooling capacity is provided when more cooling is required. In some installations it may be desirable to place the heat exchanger within the tactical aircraft fuel tank. However, such a structure would lose the automatic benefits just mentioned.

Although a preferred embodiment of this invention is illustrated, it will be realized that various modifications of the structural details may be made without departing from the mode of the operation and the essence of the invention. Therefore, except insofar as they are claimed in the appended claims, structural details may be varied widely without modifying the mode of operation. Accordingly, the appended claims and not the aforesaid description are determinative of the scope of the invention.

I claim:
1. A method of cooling high speed aircraft comprising flying a tanker aircraft at high altitudes and cooling the fuel carried thereby with cold atmospheric air, transferring cold fuel from said tanker aircraft to said high speed aircraft while both are airborne, and thereafter cooling portions of said high speed aircraft by transferring heat from such portions to said cold fuel.

2. A method of cooling high speed aircraft comprising cooling fuel in a tanker aircraft, transferring cold fuel from said tanker aircraft to said high speed aircraft, and thereafter cooling portions of said high speed aircraft by transferring heat from such portions to said cold fuel.

References Cited in the file of this patent

UNITED STATES PATENTS

| | | |
|---|---|---|
| 1,140,250 | Cabot | May 18, 1915 |
| 2,145,678 | Backstrom | Jan. 31, 1939 |
| 2,501,898 | Haggerty | Mar. 28, 1950 |
| 2,625,007 | Traux | Jan. 13, 1953 |
| 2,676,773 | Sanz et al. | Apr. 27, 1954 |
| 2,716,527 | Needham | Aug. 30, 1955 |

FOREIGN PATENTS

| | | |
|---|---|---|
| 435,653 | France | Jan. 4, 1912 |
| 509,115 | Great Britain | July 11, 1939 |